US012756984B2

(12) United States Patent
Westland et al.

(10) Patent No.: US 12,756,984 B2
(45) Date of Patent: Oct. 6, 2026

(54) VISUALIZATION AND CUSTOMIZATION OF SOUND SPACE

(71) Applicant: Meta Platforms Technologies, LLC, Menlo Park, CA (US)

(72) Inventors: Joy Westland, Bothell, WA (US); Amanda Barry, Kirkland, WA (US); Anjali Induchoodan Menon, Redmond, WA (US); Madeline Huberth, San Carlos, CA (US); Sangeetha Lalitha Ramachandran, Sammamish, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 138 days.

(21) Appl. No.: 18/598,310

(22) Filed: Mar. 7, 2024

(65) Prior Publication Data

US 2024/0340603 A1 Oct. 10, 2024

Related U.S. Application Data

(60) Provisional application No. 63/458,369, filed on Apr. 10, 2023.

(51) Int. Cl.
*H04S 7/00* (2006.01)

(52) U.S. Cl.
CPC . *H04S 7/30* (2013.01); *H04S 7/40* (2013.01)

(58) Field of Classification Search
CPC ..................................... H04S 7/30; H04S 7/40
See application file for complete search history.

(56) References Cited

U.S. PATENT DOCUMENTS

| | | | |
|---|---|---|---|
| 9,266,019 | B2 | 2/2016 | Kim |
| 9,384,594 | B2 | 7/2016 | Maciocci et al. |
| 9,729,864 | B2 | 8/2017 | Stafford |
| 9,760,790 | B2 | 9/2017 | Novak |
| 9,939,635 | B2 | 4/2018 | Thomas et al. |

(Continued)

FOREIGN PATENT DOCUMENTS

CN 109671118 A 4/2019

OTHER PUBLICATIONS

Co-pending U.S. Appl. No. 17/673,682, inventors David; Frederick Geisert et al., filed on Feb. 16, 2022.

(Continued)

*Primary Examiner* — Seth A Silverman
(74) *Attorney, Agent, or Firm* — Greenberg Traurig, LLP

(57) ABSTRACT

An audio system for visualizing and customizing a sound space. The audio system detects sound signals and determines directions of the sound signals. The audio system associates each of the sound signals with a visualization, and provides a graphical user interface (GUI) to display a sound space based on the visualizations and the directions of the sound signals. The visualizations are placed at positions on the GUI corresponding to the directions of the respective sound signals relative to a user. The GUI also includes an interactive element configured to receive a user interaction for modifying a parameter of a particular sound signal. Responsive to receiving the user interaction, the audio system modifies the parameter of the particular sound signal, and plays the sound signals with the particular sound signal modified based on the user interaction.

18 Claims, 8 Drawing Sheets

(56) References Cited

U.S. PATENT DOCUMENTS 10,002,429 B2 6/2018 Yoon et al.
10,127,731 B1 11/2018 Ozery
10,338,392 B2 7/2019 Kohler et al.
10,503,996 B2 12/2019 Novak
10,617,956 B2 4/2020 Black et al.
10,627,635 B2 4/2020 Kiemele et al.
10,691,945 B2 6/2020 Bostick et al.
10,773,169 B2 9/2020 Leeper et al.
10,812,422 B2 10/2020 Mullins
10,818,089 B2 10/2020 Gough et al.
10,928,887 B2 2/2021 Bostick et al.
10,974,132 B2 4/2021 Drake et al.
10,976,804 B1 4/2021 Atlas et al.
11,009,716 B2 5/2021 Kiemele et al.
11,144,759 B1 10/2021 Hatfield et al.
11,184,362 B1 11/2021 Krol et al.
11,232,644 B1 1/2022 Lee
11,410,360 B2 8/2022 Ruth et al.
11,410,395 B2 8/2022 Velasquez et al.
11,468,604 B2 10/2022 Jagnow et al.
11,551,430 B2 1/2023 Velasquez et al.
11,568,605 B2 1/2023 Shahrokni et al.
11,580,711 B2 2/2023 Berliner et al.
2010/0169796 A1 7/2010 Lynk et al.
2010/0286806 A1* 11/2010 Booth ...................... H04R 5/04 381/103
2013/0293586 A1 11/2013 Kaino et al.
2015/0024368 A1 1/2015 King, Jr.
2016/0057726 A1 2/2016 Bai et al.
2016/0093108 A1 3/2016 Mao et al.
2016/0335808 A1 11/2016 Novak
2016/0350973 A1 12/2016 Shapira et al.
2017/0019745 A1* 1/2017 Lee ...................... H04R 29/008
2017/0262045 A1 9/2017 Rouvinez et al.
2017/0287215 A1 10/2017 Lalonde et al.
2017/0358141 A1 12/2017 Stafford et al.
2017/0372499 A1 12/2017 Lalonde
2018/0004481 A1 1/2018 Fallon
2018/0020312 A1 1/2018 Visser et al.
2018/0034867 A1 2/2018 Zahn et al.
2018/0276891 A1 9/2018 Craner
2018/0321894 A1 11/2018 Paulovich et al.
2018/0374276 A1 12/2018 Powers et al.
2019/0011978 A1 1/2019 Ravindran et al.
2019/0041651 A1 2/2019 Kiemele et al.
2019/0073829 A1 3/2019 Holz et al.
2019/0172262 A1 6/2019 McHugh et al.
2019/0188895 A1 6/2019 Miller, IV et al.
2019/0204599 A1 7/2019 Abbott
2019/0227312 A1* 7/2019 Lai .......................... G06F 3/011
2019/0320138 A1 10/2019 Kaufthal
2019/0329136 A1 10/2019 Koyama et al.
2019/0378280 A1 12/2019 Cho et al.
2020/0035030 A1 1/2020 Schradin et al.
2020/0103521 A1 4/2020 Chiarella et al.
2020/0167003 A1 5/2020 Nonomura et al.
2020/0209957 A1* 7/2020 Sztuk ..................... H04N 7/157
2020/0225495 A1 7/2020 Kiemele et al.
2020/0234559 A1 7/2020 Chen et al.
2020/0236464 A1* 7/2020 Kang ..................... G01H 13/00
2020/0342673 A1 10/2020 Lohr et al.
2020/0359158 A1 11/2020 Brimijoin, II et al.
2020/0371596 A1 11/2020 Lee
2020/0394012 A1 12/2020 Wright, Jr. et al.
2020/0394807 A1 12/2020 Horesh et al.
2021/0029479 A1 1/2021 Donley et al.
2021/0055367 A1 2/2021 Poore et al.
2021/0081031 A1 3/2021 Perlin et al.
2021/0092081 A1 3/2021 Mullins
2021/0287382 A1 9/2021 Lehrich et al.
2021/0312887 A1 10/2021 Griswold et al.
2021/0358516 A1* 11/2021 Jeong ..................... H04R 1/406
2022/0075591 A1 3/2022 Cardenas Gasca et al.
2022/0284915 A1* 9/2022 Rosenwein ......... G10L 21/0216
2023/0010105 A1 1/2023 Ha et al.
2023/0051775 A1 2/2023 Hamadou
2023/0080905 A1 3/2023 Tomczek et al.
2023/0081452 A1 3/2023 Ellappan et al.
2024/0104864 A1 3/2024 Mulliken et al.
2024/0194040 A1 6/2024 Geisert et al.
2024/0233914 A1 7/2024 Wei et al.

OTHER PUBLICATIONS

International Search Report and Written Opinion for International Application No. PCT/US2023/013223, mailed May 22, 2023, 12 pages.

Lacoche J., et al., "Collaborators Awareness for User Cohabitation in Co-Located Collaborative Virtual Environments," 23rd ACM Symposium on Virtual Reality Software and Technology(VRST), Nov. 8, 2017, No. 15, 9 pages.

Scavarelli A., et al., "VR Collide! Comparing Collision-Avoidance Methods between Co-Located Virtual Reality Users," Conference Extended Abstracts on Human Factors in Computing Systems, May 6, 2017, pp. 2915-2921.

European Search Report for European Patent Application No. 24157372.4, dated Jun. 4, 2024, 3 pages.

European Search Report for European Patent Application No. 24167263.3, dated Aug. 27, 2024, 7 pages.

International Preliminary Report on Patentability for International Application No. PCT/US2023/082730, mailed Jun. 19, 2025, 8 pages.

International Search Report and Written Opinion for International Application No. PCT/US2023/082730, mailed Apr. 11, 2024, 11 pages.

Office Action mailed Feb. 20, 2025 for European Patent Application No. 24157372.4, filed on Feb. 13, 2024, 9 pages.

* cited by examiner

VISUALIZATION AND CUSTOMIZATION OF SOUND SPACE

CROSS-REFERENCE TO RELATED APPLICATION(S)

This application claims priority to U.S. Provisional Patent Application No. 63/458,369, titled "Visualization and Customization of Sound Space," filed on Apr. 10, 2024 and which is herein incorporated by reference in its entirety.

TECHNICAL FIELD

This disclosure relates generally to audio systems, and more specifically to visualizing and customizing sound spaces for audio systems.

BACKGROUND

A sound space is a space with different types of sounds coming from different directions, such as voices, emergency sounds, traffic sounds, airplane sounds, sounds of nature, etc. We live in a constantly changing sound space. When we are reading or writing, we would like to block out all or most of the sounds; while in nature, we may enjoy the sound of birds or flowing water.

Figure 1A:
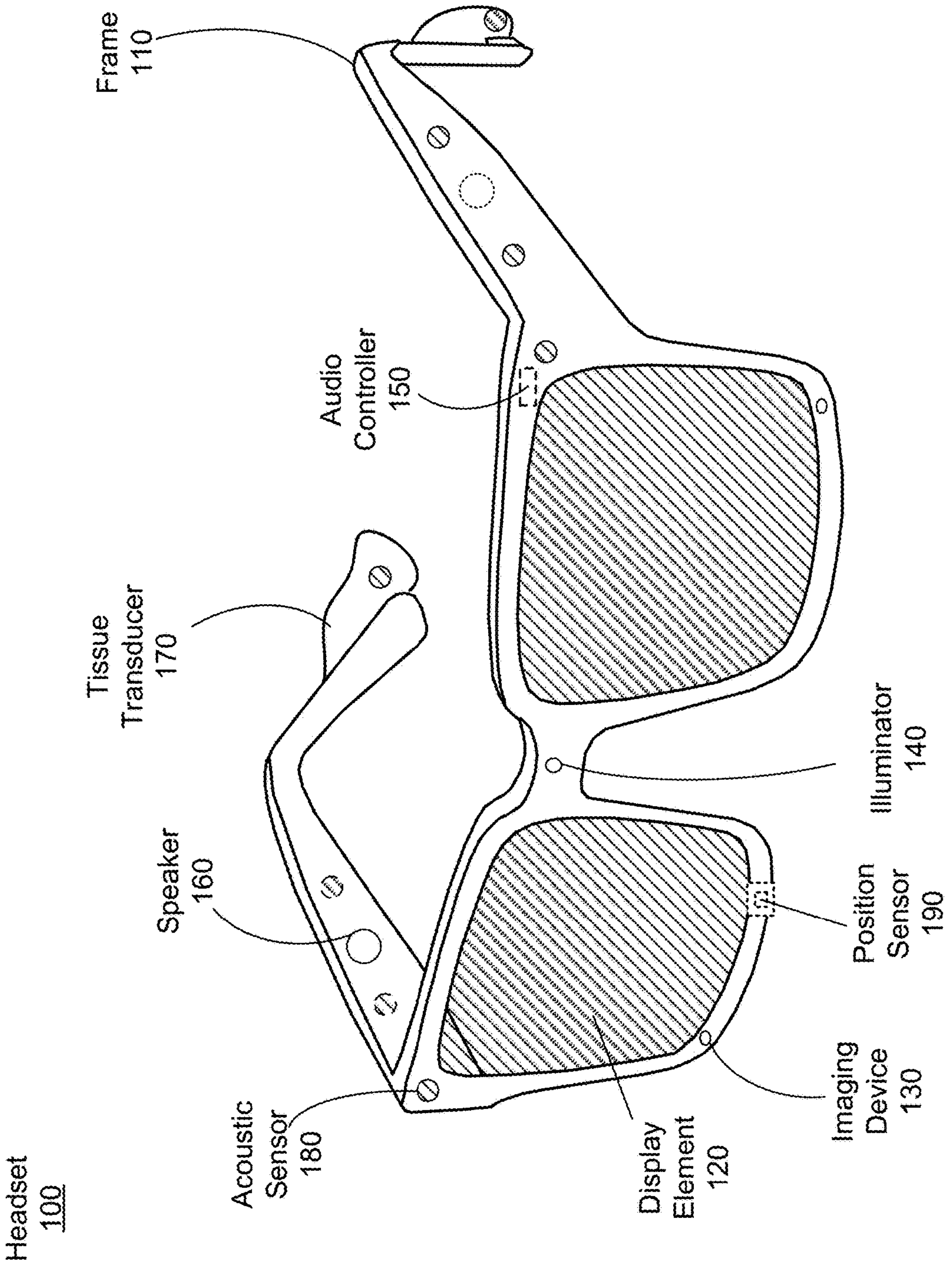
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

We live in a sound space with different types of sounds coming from different directions, such as voices, emergency sounds, traffic sounds, airplane sounds, sounds of nature, etc. When we are reading or writing, we would like to block out all or most of the sounds; while in nature, we may enjoy the sound of birds or flowing water. Embodiments described herein include a method or an audio system for visualizing and modifying a sound space. A user can customize the sound space by interacting with the visualizations. As such, the user can see different types of sounds coming from different directions in a graphical user interface (GUI), and selectively attenuate or enhance certain types of sounds via interacting with the user interface, e.g., a bird watcher can enhance a sound of a bird in nature by interacting with the GUI.

The audio system detects one or more sound signals and determines a direction of each of the sound signals. Each sound signal can be associated with a visualization. The audio system may be integrated into a device (e.g., headset) that provides a graphical user interface (GUI) to display the sound space based on the visualizations and the directions of the multiple sound signals. The GUI may include the visualizations of the multiple sound signals. The visualizations can be placed at positions on the GUI corresponding to the directions of the respective sound signals. The GUI can include an interactive element configured to receive a user interaction to modify a parameter of a particular sound signal among the multiple sound signals.

Responsive to receiving the user interaction, the audio system modifies the parameter of the particular sound signal based on the user interaction, and plays the multiple sound signals with the particular sound signal modified based on the user interaction. For example, the modification of the parameter of the particular sound signal may include modifying a volume of the particular sound signal, e.g., muting, attenuating, or enhancing the particular sound signal. As another example, the modification of the parameter of the particular sound signal may also include modifying a direction of the particular sound signal.

In some embodiments, the audio system provides one or more themes, each of which corresponds a set of parameters for the sound signals. For example, the one or more themes may include a studying theme, a party theme, a hiking theme, a bird-watching theme, etc. The set of parameters of the studying theme may include muting all the sound signals. The set of parameters for the party theme may include enhancing voice signals and muting other sound signals. The set of parameters for the hiking theme may include enhancing sounds of nature and muting all man-made sound signals. The bird-watching theme may include enhancing sounds of birds. In some embodiments, users may set their own themes with custom parameters. For example, a user may selectively enhance or attenuate a particular person's voice.

In some embodiments, a method is described. Sounds signals can be detected. A direction of each of the sound signals can be determined, and each of the sound signals can be associated with a visualization. A sound space can be displayed via a graphical user interface (GUI) based in part on the visualizations and the directions of sound signals. The visualizations of the sound signals can be placed at positions on the GUI corresponding to the directions of the respective sound signals relative to a user, and the GUI comprises an interactive element configured to receive a user interaction for modifying a parameter of a particular sound signal among the sound signals. Responsive to receiving the user interaction, the parameter of the particular sound signal can be modified based in part on the user interaction. The sound signals with the particular sound signal modified based in part on the user interaction can be presented.

In some embodiments, a non-transitory computer-readable storage medium is described. The non-transitory computer-readable storage medium comprises stored instructions, the instructions when executed by a processor of a device, can cause the device to: detect sound signals and determine a direction of each of the sound signals. The executed instructions can also cause the device to associate each of the sound signals with a visualization, and display via a graphical user interface (GUI) a sound space based in part on the visualizations and the directions of sound signals. The visualizations of the sound signals can be placed at positions on the GUI corresponding to the directions of the respective sound signals relative to a user, and the GUI can comprise an interactive element configured to receive a user interaction for modifying a parameter of a particular sound signal among the sound signals. The executed instructions can be such that responsive to receiving the user interaction, the device can be configured to modify the parameter of the particular sound signal based in part on the user interaction. The executed instructions cause the device to present the sound signals with the particular sound signal modified based in part on the user interaction.

In some embodiments, a device is described. The device may be, e.g., a headset. The device can include a sensor array, a display element, a controller, and a transducer array. The sensor array can be configured to detect sound signals. The display element can be configured to present visual content. The controller can be configured to: determine a direction of each of the sound signals and associate each of the sound signals with a visualization. The controller may also instruct the display element to present a graphical user interface (GUI) that displays a sound space based in part on the visualizations and the directions of sound signals. The visualizations of the sound signals can be placed at positions on the GUI corresponding to the directions of the respective sound signals relative to a user, and the GUI can comprise an interactive element configured to receive a user interaction for modifying a parameter of a particular sound signal among the sound signals. The controller can be configured to modify the parameter of the particular sound signal based in part on the user interaction. The transducer array can be configured to present the sound signals with the particular sound signal modified based in part on the user interaction.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a local compute device (e.g., wired or wireless device worn by the user of the headset 100 that provides additional compute capabilities) or by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 5.

The acoustic sensors 180 are configured to detect one or more sound signals. The audio controller 150 is configured to determine a direction of each of the detected sound signals. Each of the sound signals is associated with a visualization. The display element 120 is configured to display a GUI that visualizes a sound space based on the visualizations and directions of the sound signals. The visualizations of the sound signals are placed at positions on the GUI corresponding to the directions of the respective sound signals. The GUI includes an interactive element configured to receive a user interaction for modifying a parameter of a particular sound signal. Responsive to receiving the user interaction, the HMD 100 or 105 modifies the parameter of the particular sound signal based in part on the user interaction, and plays the sound signals with the particular sound signal modified based in part on the user interaction. For example, the modification of the parameter of the particular sound signal may include modifying a volume of the particular sound signal, such as muting, attenuating, or enhancing the particular sound signal. As another example, the modification of the parameter of the particular sound signal may include modifying a direction of the particular sound signal, and/or a distance between a source of the particular sound signal and the user.

In some embodiments, the headset 100 or 105 tracks the eye movements of the user. Responsive to determining that the user's eyes are focused on a source of a particular sound signal, the headset 100 or 105 automatically enhances the particular sound. In some embodiments, the headset 100 or 105 captures images of a surrounding area, and displays the captured images to the user in near real time. The user can zoom into an area where the source of the particular sound signal is present. Responsive to the user's zooming into the area having the source of the particular sound signal, the headset 100 or 105 may automatically enhance the particular sounds. In some embodiments, responsive to a source of a particular sound signal no longer in a field of view of the headset 100 or 105, the headset 100 or 105 may automatically attenuate, mute, or phase-out of the particular sound signal.

In some embodiments, the headset 100 or 105 captures an image of a sound source, and the captured image is used as the visualization of the corresponding sound signal. In some embodiments, headset 100 or 105 identifies the sound source automatically. Alternatively, or in addition, the user can set an object in the captured image as a sound source.

Note, the headsets 100 and 105 are examples of forms of the audio system described herein, although the audio system is not limited to these forms. For example, the audio system may also be in a form of earbuds and/or a mobile device, and the GUI may be displayed on a mobile device that is connected to the earbuds via a wired or a wireless communication interface, e.g., Bluetooth Low Energy (BLE).

Figure 1B:
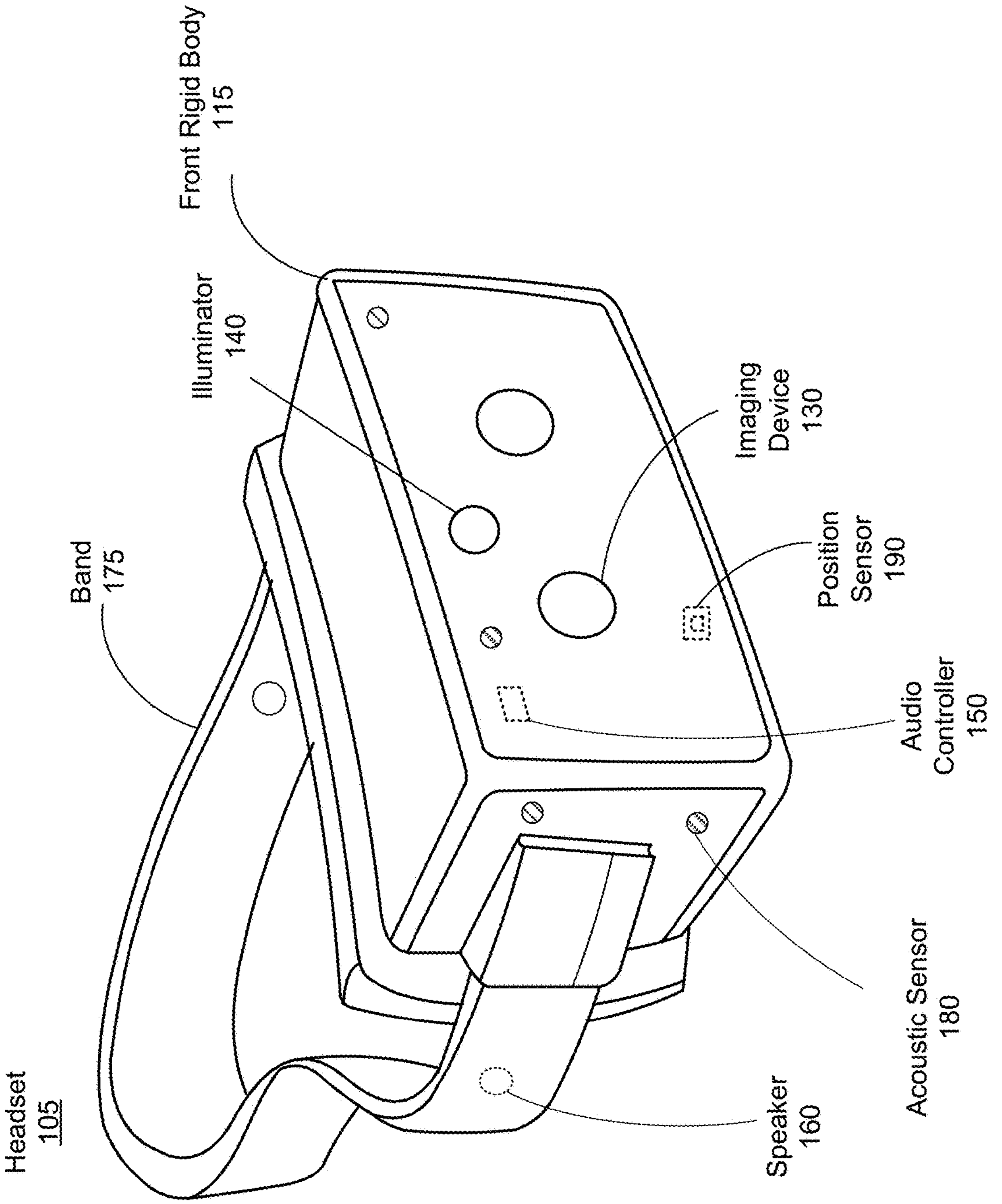
FIG. 1B is a perspective view of a headset implemented as a head-mounted display, in accordance with one or more embodiments.

FIG. 1B is a perspective view of a headset 105 implemented as an HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
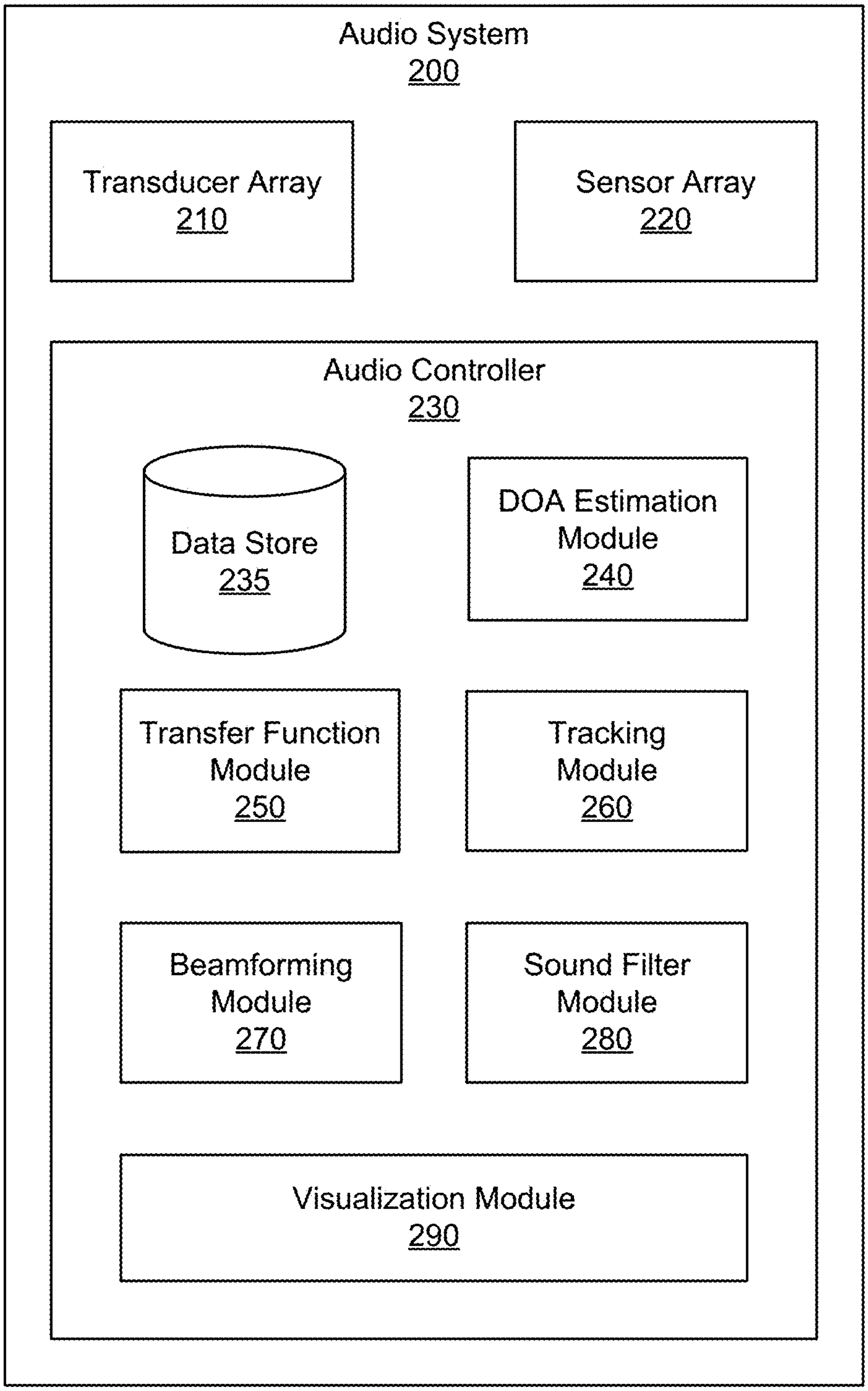
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a direction of arrival (DOA) estimation module 240, a transfer function module 250, a tracking module 260, a beamforming module 270, a sound filter module 280, and a visualization module 290. The audio controller 230 may be located inside a headset, in some embodiments. Some embodiments of the audio controller 230 can have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, visualizations corresponding to different sound signals, and other data relevant for use by the audio system 200, or any combination thereof.

The user may opt-in to allow the data store 235 to record data captured by the audio system 200. In some embodiments, the audio system 200 may employ always on recording, in which the audio system 200 records all sounds captured by the audio system 200 in order to improve the experience for the user. The user may opt in or opt out to allow or prevent the audio system 200 from recording, storing, or transmitting the recorded data to other entities.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may be used to identify differences in signal intensity, for example, or differences in time of arrival. These differences may be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may be analyzed to identify the angle at which the sensor array 220 received the direct-path audio signal. The determined angle may be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

In some implementations, the DOA estimation module may also be used in conjunction with image or video data. The image or video data may be used to help localize a particular audio source (e.g., mapping types of sounds to objects likely to make those types of sounds) and/or may corelate identified sound directions to objects identified in those directions. For example, a sounds of a bird chirping may be corelated with a bird that has been recognized, in the image or video data, from the same direction. Known computer vision techniques can be used to perform this object recognition. Further, machine learning systems can be trained to take recognized objects and sounds (paired in training data as the object creating, or not creating, the sound) and return a result of whether the provided object is a likely source of the sound. In some cases, this can be further improved by the machine learning system also being provided with an estimated direction correlation between the object and the sound.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources corresponding to sounds detected by the sensor array 220. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 5).

The sound filter module 280 provides the sound filters to the transducer array 210. In some embodiments, the sound filters may cause positive or negative amplification of sounds as a function of frequency, or provide other modifications e.g., to pitch, tone, cadence, directional source, etc. of a sound. In some implementations, sound filter module 280 can both provide a negative amplification of a sound (e.g., by applying an inverse wave function to cancel out the original source of a sound) while also applying a modification to the sound e.g., to change its directional source, pitch, tone, etc. For example, a deep voice can be cancelled out while the audio is modified to be heard by the headset wearer as having a lighter tone.

The visualization module 290 associates each sound (detected by the sensor array 220 and processed by DOA estimation module 250 and tracking module 260) with a visualization and generates a visual depiction of a sound space based on the visualizations and the directions of the detected sounds. In various implementations, the visualizations can include indicators of the qualities of the sounds (e.g., sized or colored according to the sound volume, pitch, tone, or an identified sound type), an icon, image, or animation matching a type identified for the sound source (as further described below), a selection for the sound source (e.g., highlighting, color change or shading, or another object display filter), and/or can include default sound indicators (e.g., a sound icon, waveforms matching the sound, or distortion filters applied to the GUI with the distortion configured to match the sound waveform). In some implementations, the system can include a mapping of sound identifiers to visualizations, such that the system can determine an identifier for the sound and then select a lowest item in a mapping hierarchy that matches the identifier. For example, a machine learning model can be trained to take encoded sound and produce corresponding identifiers. In some implementations, instead of a mapping, a generative machine learning model can be trained to take encoded sounds and directly product a corresponding icon, image, or animation visualization matching the sound. In some implementations, the machine learning model can also receive one or more images of an object determined to be producing the sound, for the machine learning model to provide a visualization, either corresponding to the object and/or as an augmentation or modification of the object image(s).

The visualization module 290 works with one or more display elements of a device (e.g., the headset 100 and/or the headset 105) that incorporates the audio system 200 to present the visual depiction of the sound space to a user of the device. The presented visual depiction of the sound space is part of a GUI that is presented by the device. The visualizations of the sounds are placed at positions on the GUI corresponding to the directions of the plurality of respective sounds relative to a user and/or can be attached to objects determined to be the source of the sound.

Notably, a sound space may be constantly changing, and a user's location may also be changing. In some embodiments, the visualization module 290 is configured to monitor the sound space. Responsive to detecting a change of a sound source, the visualization module 290 updates the sound space based on the change. The change may be that the sound source is moving away or closer, and/or moving its direction, relative to the user.

In some embodiments, the visualization module 290 further includes one or more interactive elements configured to receive different user interactions for modifying one or more parameters of the detected sounds. In some embodiments, each sound is associated with a set of interactive elements, configured to receive different user interactions for modifying parameters of the corresponding sound, such as modifying a volume of a sound, modifying a direction of a sound, changing a tone of the sound, changing a playback rate of the sound,. In some implementations, these interactions can alternatively be signaled using pre-mapped gestures, vocal commands, determined user attention, etc. Responsive to receiving the user interactions, the transfer function module 250, the beam forming module 270, and/or the sound filter module 280 are configured to perform various transformations to the affected sound to generate a modified sound. For example, when the user interaction indicates attenuating a particular sound, the sound filter module 280 reduces a volume of the particular sound. As another example, when the user interaction indicates moving a particular sound from a first direction to a second direction, the transfer function module 250 and/or the beam forming module 270 perform transformations to the sound to generate a modified sound signal, where the modified sound will appear to the user as if it were from a second direction. In yet another example, a modification to one sounds may cause corresponding modifications to other sounds, e.g., when the user's attention in on one sounds producing object, the volume of the corresponding sound may be increased while the volume of all other sounds in the sound space may be decreased.

In some embodiments, the visualization module 290 changes the visual depiction of the sound pace in accordance with feedback (e.g., a user interaction) from the user. For example, the visualization module 290 may receive a user interaction for modifying a direction of a sound includes moving (e.g., dragging and dropping) a visualization of the sound from a first location to a second location on the GUI.

In some embodiments, the headset 100 or 105 provides one or more themes, each corresponding to one or more parameters corresponding to each of the detected sound signals. For example, the one or more themes may include a studying theme, a party theme, a hiking theme, a birdwatching theme, etc. The set of parameters of the studying theme may include muting all the sound signals. The set of parameters for the party theme may include enhancing voice signals and muting other sound signals. The set of parameters for the hiking theme may include enhancing sounds of nature and muting all man-made sound signals. The birdwatching theme may include enhancing sounds of birds. In some embodiments, users may set their own themes with custom parameters. For example, a user may selectively enhance or attenuate a particular person's voice. In some embodiments, the setting of the themes may also be performed by the visualization module 290 (e.g., via interactions with the GUI). In some embodiments, when the user selects a theme, or sets a theme, the GUI 290 shows the status of each of the detected sound signals corresponding to the parameters of the theme, e.g., a mute icon is displayed next to a sound signal that is muted, a loudspeaker icon is displayed next to a sound signal that is enhanced, etc.

Figure 3A:
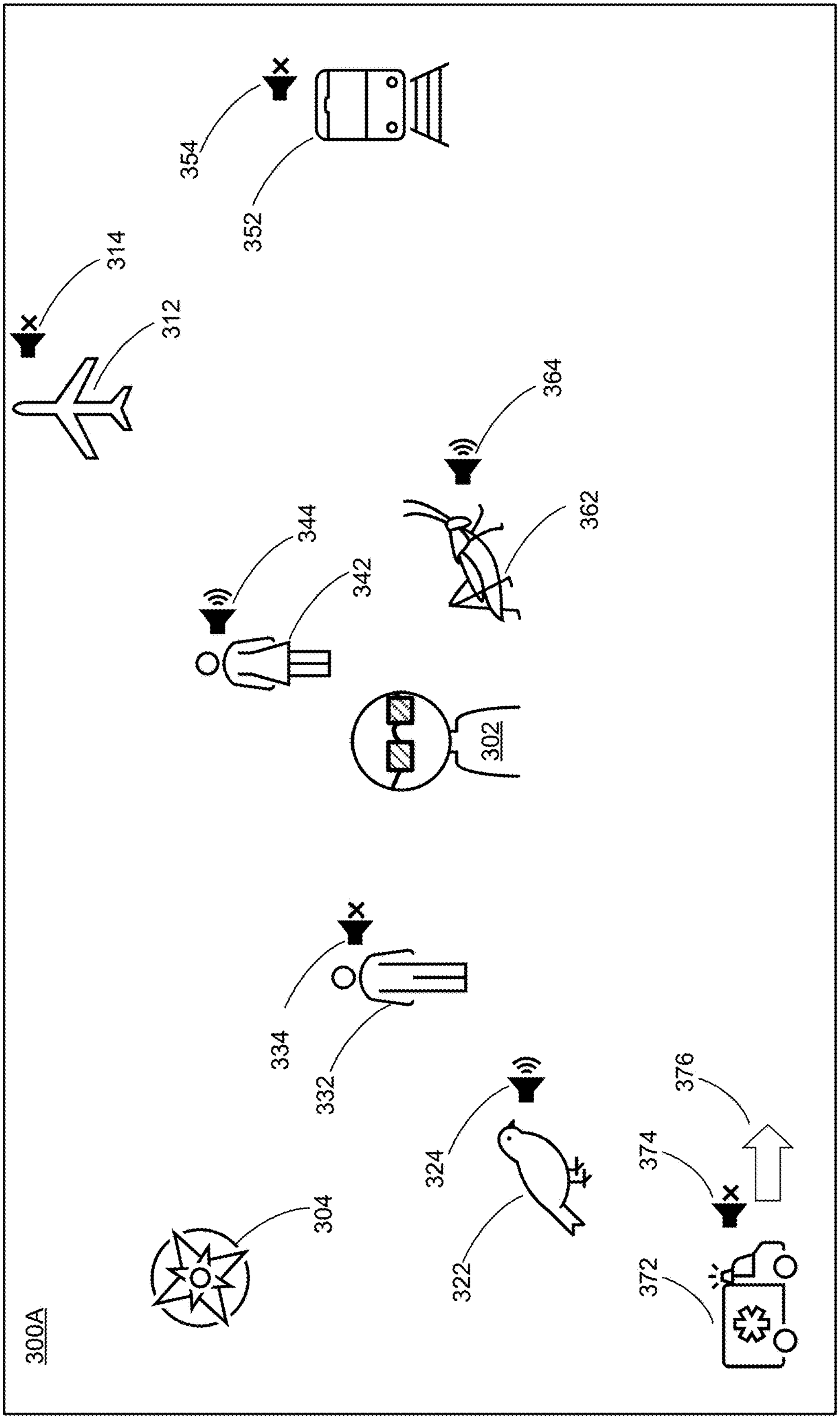
FIG. 3A illustrates am example graphical user interface (GUI), in accordance with one or more embodiments.
Figure 3B:
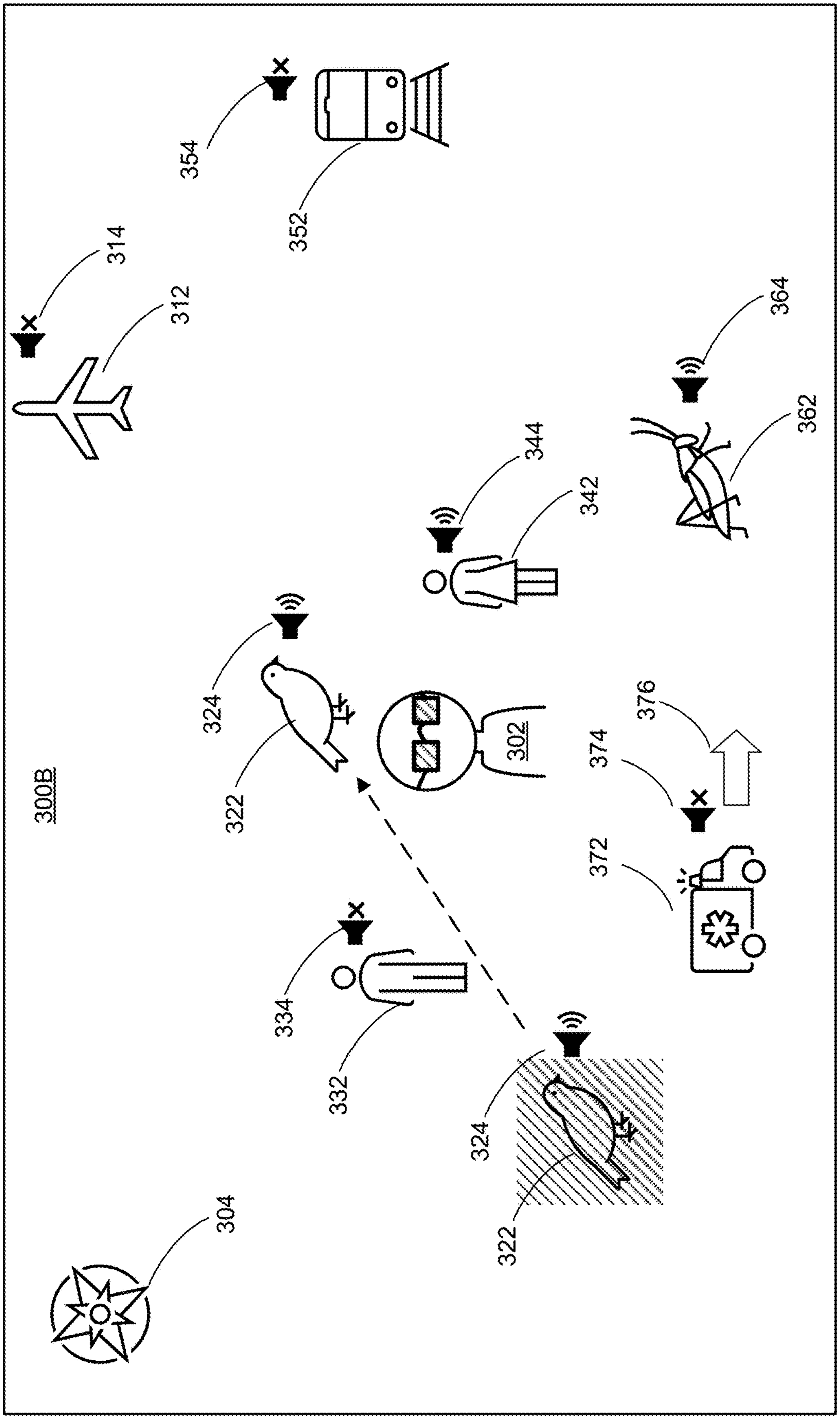
FIG. 3B illustrates an example GUI in which a user moved a visualization corresponding to a bird sound from a left position to a center position, in accordance with one or more embodiments.
Figure 3C:
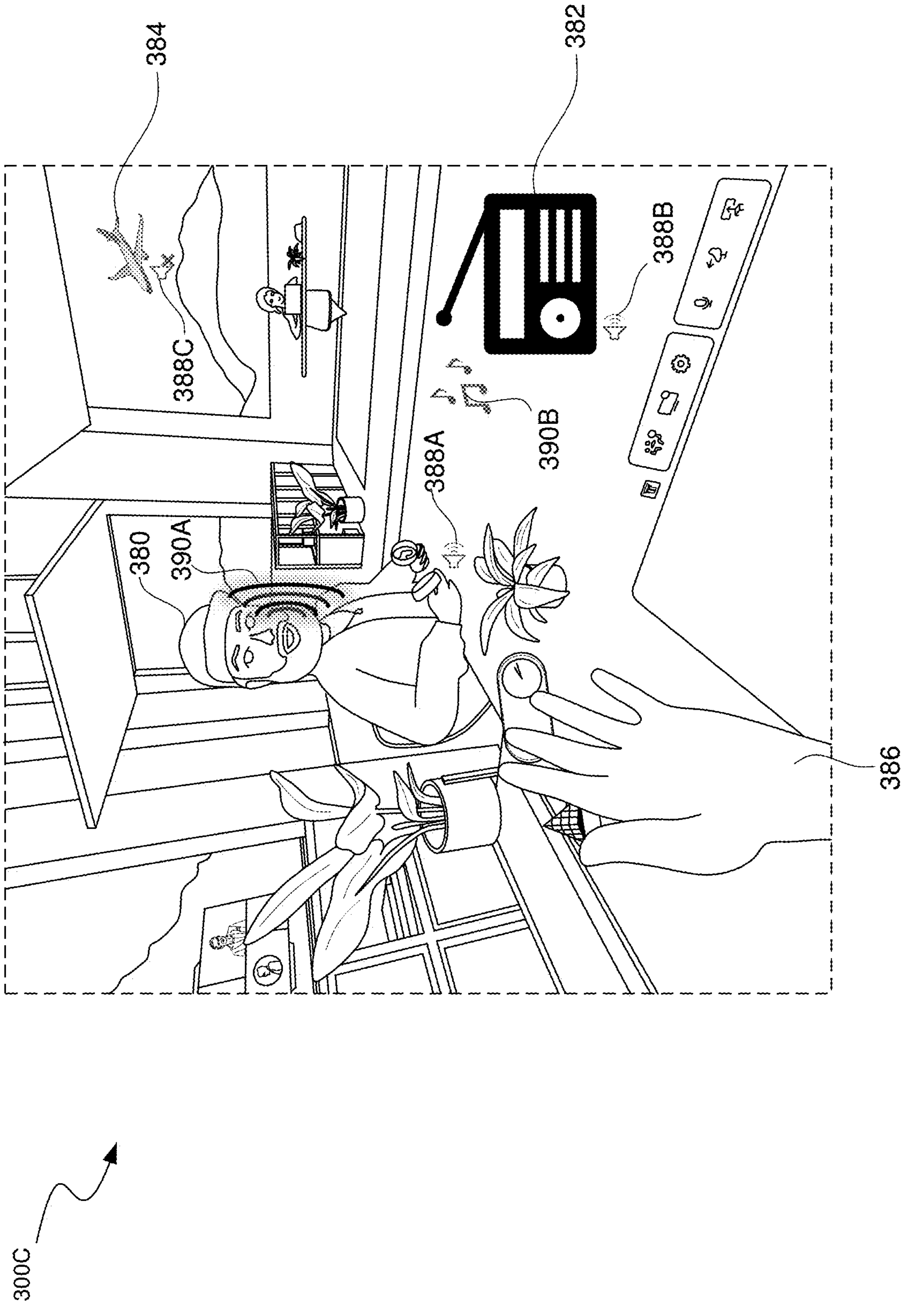
FIG. 3C illustrates an example 3D GUI which provides multiple visualizations corresponding to sounds from multiple sound sources.

FIGS. 3A, 3B, and 3C illustrate example GUIs 300A, 300B, 300B in accordance with one or more embodiments. The GUIs 300A and 300B are presented using a third person view. Example 300C presents content in a first person view.

FIG. 3A illustrates an example GUI 300A, in accordance with one or more embodiments. The GUI 300A is an embodiment of the GUI controlled by the audio system 200. As illustrated in FIG. 3A, the GUI 300A includes a user icon 302, a compass icon 304, and multiple visualizations 312, 322, 332, 342, 352, 362, 372, corresponding to multiple sound signals. Visualization 312 is an airplane icon representing an airplane sound, visualization 322 is a bird icon representing a bird sound, visualization 332 is a first person icon representing a first voice signal, visualization 342 is a second person icon representing a second voice signal, visualization 352 is a train icon representing a train sound signal, visualization 362 is a chirping bug icon representing a bug sound signal, and visualization 372 is an emergency vehicle icon representing an emergency vehicle sound signal. The compass icon 304 indicates absolute directions. The user icon 302 represents a user. The positions of the visualizations 312, 322, 332, 342, 352, 362, 372 relative to the user icon 302 represent the relative direction and/or distance of the sound signals relative to the user. In some embodiments, if a sound signal is moving, the visualization may also indicate a moving direction of the sound signal. For example, the emergency vehicle may be moving, and the arrow 376 represents the moving direction of the emergency vehicle.

Next to each visualization 312, 322, 332, 342, 352, 362, or 372, there is a respective interactive element 314, 324, 334, 344, 354, 364, or 374 configured to receive different user interactions for modifying the parameters of the respective sound signal. The parameters may include a volume of the sound signal, a distance, and/or a direction of the sound signal. In this example, a user may be able to interact with the interactive elements 314, 324, 334, 344, 354, 364, 374 to mute, attenuate, or enhance the respective sound signals. As illustrated, airplane sound signal corresponding to visualization 312, the train sound signal corresponding to visualization 352, the voice signal corresponding to visualization 332, and the emergency vehicle sound signal corresponding to visualization 372 have been muted, while the bird sound signal corresponding to visualization 322, the bug sound signal corresponding to visualization 362, and the voice signal corresponding to visualization 322 are kept or enhanced.

In some embodiments, a user can drag and drop a visualization to move the visualization to another position on the GUI 300A. Responsive to moving the visualization, the distance and/or direction of the sound is changed accordingly. For example, a bird watcher may want to move the bird sound to a center and closer position to themselves, and they can move visualization 322 from the left side to a center location.

In some implementations, additional sound modifications can be performed, such a changing the tone of the sound (e.g., changing a male voice to a female voice), changing the playback speed of a sound (e.g., slowing down or speeding up the playback of a recorded lecture), changing the type of a sounds (e.g., changing the sound of the train 352 to the sound of a boat or changing the sound of a guitar to that of a plano), changing the pitch of a sound (e.g., changing the pitch so people with older ears can hear it), etc. In some implementations, these changes can be selected through a tool selection, gesture, or voice command pre-mapped to that change. In other cases, the change can be performed using a machine learning system, where user commands (e.g., through voice/text) are mapped to a change e.g., using a large language model with training data that includes audio change commands mapped to textual inputs.

FIG. 3B illustrates an example GUI 300B in which the user has moved visualization 322, corresponding to the bird sound from the left side to a center position facing the user. Responsive to the movement of visualization 322, the audio system 200 modifies the bird sound signal to generate a modified bird sound signal, such that the bird sound appears as if the bird is in front of the user. In some embodiments, a sound source or the user may be moving, and the tracking module 260 tracks a location of the sound source, and the audio system 200 constantly modifies the received sound signal corresponding to the sound source to cause the sound signal to appear, to the user, as if it is not moving. For example, after the user moves the bird visualization 322 to be at the center position facing the user, the tracking module 260 may be configured to track the bird's location, and constantly transforms the received bird sound signal to cause the transformed bird sound signal to appear as if the bird is always in front of the user.

FIG. 3C illustrates an example 3D GUI 300C which provides multiple visualizations corresponding to sounds from multiple sound sources. GUI 300C includes multiple sound sources 380 (another user), 382 (a radio), and 384 (an airplane). The system has determined a direction and object source for each of these sound sources and has attached one or more visualizations to each. For the other user 380, the system has attached a sound lines visualization 390A corresponding to speech sounds the other user 380 is making and a mute/unmute control 388A. For the radio 382, the system has attached a notes visualization 390B corresponding to music sounds the radio 382 is making and a mute/unmute control 388B. For the airplane 384, the user, with hand 386, has tapped the mute control 388C, causing the system to generate an inverse waive for this sound and thereby causing the user not to be able to hear it, so no sound visualizations are provided. The user can provide further inputs using hand 386, e.g., to tap controls 388A-388C to mute/unmute audio sources, drag audio visualizations to different areas to change where the user hears them as coming from, or to swipe up or down on the visualization to change the sound volume.

Since the sound space is constantly changing, the GUI 300A, 300B, or 300C may be updated constantly or at a frequency, e.g., every frame, every second, every 2 seconds, etc. As illustrated, visualization 372 in FIG. 3B is moved to the right compared to visualization 372 in FIG. 3A, which is caused by the movement of the emergency vehicle. In some embodiments, the user may be able to set the updating frequency. In some embodiments, the audio system 200 sets the updating frequency based on a relative speed between a sound source and the user, e.g., the faster the relative speed, the greater frequency is set.

Figure 4:
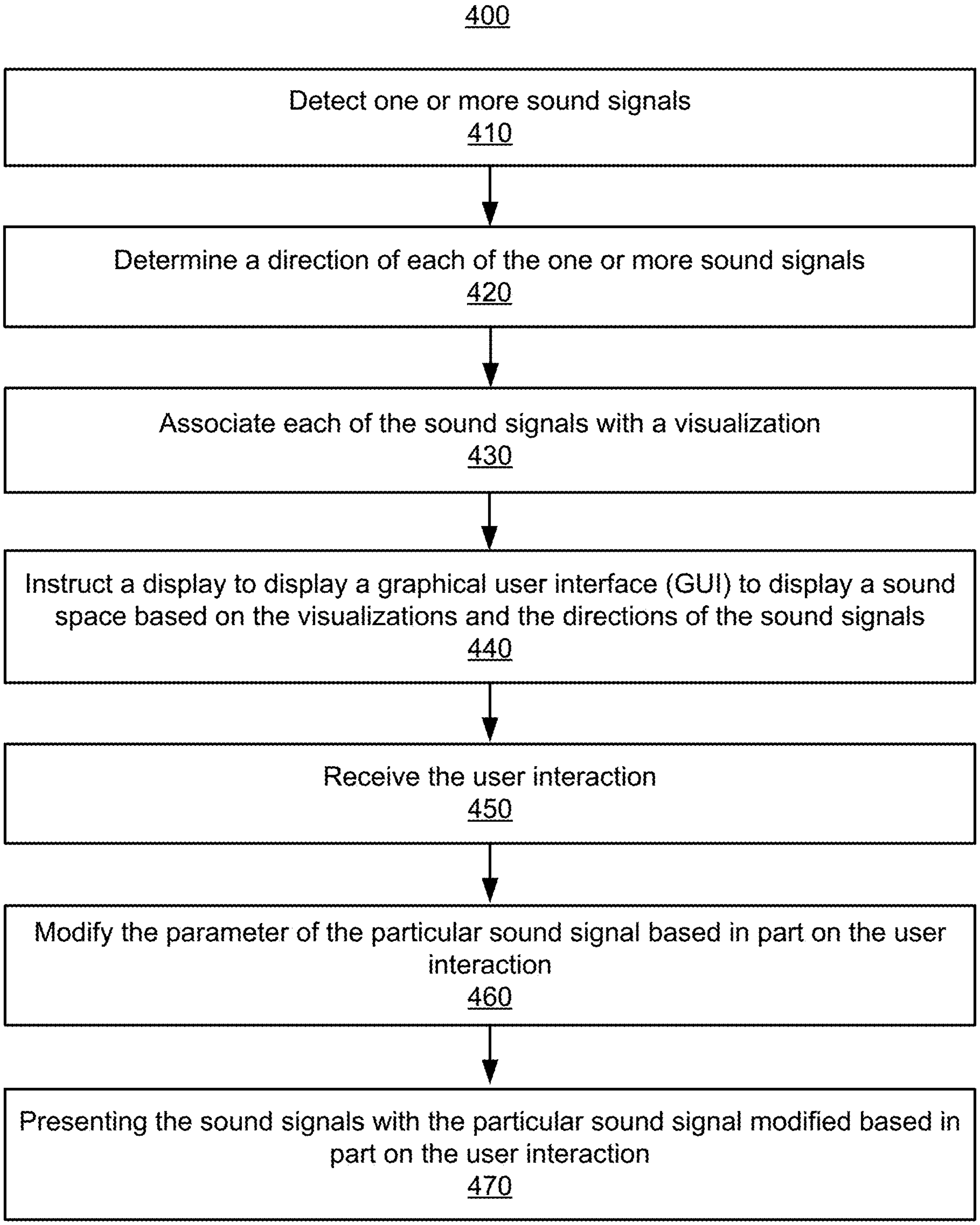
FIG. 4 illustrates a flowchart of a method for visualizing and customizing a sound space, in accordance with one or more embodiments.

FIG. 4 is a flowchart of a process 400 for visualizing and customizing a sound space, in accordance with one or more embodiments. The process 400 shown in FIG. 4 may be performed by components of an audio system (e.g., audio system 200). Other entities may perform some or all of the steps in FIG. 4 in other embodiments. Embodiments may include different and/or additional steps, or perform the steps in different orders. In various implementations, process 400 can be performed in response to an application (e.g., a particular sound visualization application or a system-level application providing sound visualization features) executing or in response to a user command requesting sound visualization be enabled.

At block 410, process 400 can detect one or more sound signals. For example, the sensor array 220 of the audio system 200 may detect the one or more sounds signals. In some cases, the sounds signals may be virtual sounds signals provide by the headset executing process 400 (e.g., spatial audio output by the headset) which can allow process 400 to detect these sounds signals by receiving indications of sound output, with sound locations, from the system.

At block 420, process 400 can determine a direction of each of the sound signals. For example, the DOA estimation module 250 of the audio system 200 may be used to determine a direction or source of each of the sound signals. In various implementations, the direction can be a relative direction and/or distance that the process 400 can determine for the sound or can be an identified object source of the sound (e.g., an object mapped into an environment around a headset device (e.g., real-world object or virtual object), having position coordinates. In some implementations, process 400 can use image or video data to help localize a particular audio source (e.g., mapping types of sounds to objects likely to make those types of sounds) and/or may corelate identified sound directions to objects identified in those directions. For example, a sounds of a bird chirping may be corelated with a bird that has been recognized, in the image or video data, from the same direction. Known computer vision techniques can be used to perform this object recognition. Further, machine learning systems can be trained to take recognized objects and sounds (paired in training data as the object creating, or not creating, the sound) and return a result of whether the provided object is a likely source of the sound. In some cases, this can be further improved by the machine learning system also being provided with an estimated direction correlation between the object and the sound. In some cases, process 400 can estimate a distance between a source of a sound signal and the headset, either based on a determined distance in a mapping system between the headset and the identified object source or by using triangulation for the sound as captured by multiple microphones on the headset (or the same microphone with a time variation and tracked movement to effectively gather two different spatial data points on the source of a sound).

At block 430, process 400 can associate each of the sound signals with a visualization. In various implementations, the visualizations can include indicators of the qualities of the sounds (e.g., sized or colored according to the sound volume, pitch, tone, or an identified sound type), an icon, image, or animation matching a type identified for the sound source (as further described below), a selection for the sound source (e.g., highlighting, color change or shading, or another object display filter), and/or can include default sound indicators (e.g., a sound icon, waveforms matching the sound, or distortion filters applied to the GUI with the distortion configured to match the sound waveform). In some implementations, the system can include a mapping of sound identifiers to visualizations, such that the system can determine an identifier for the sound and then select a lowest item in a mapping hierarchy that matches the identifier. For example, a machine learning model can be trained to take encoded sound and produce corresponding identifiers. In some implementations, instead of a mapping, a generative machine learning model can be trained to take encoded sounds and directly product a corresponding icon, image, or animation visualization matching the sound. In some implementations, the machine learning model can also receive one or more images of an object determined to be producing the sound, for the machine learning model to provide a visualization, either corresponding to the object and/or as an augmentation or modification of the object image(s).

In some embodiments, the audio system 200 is also configured to capture an image of an environment and displays the captured image on the display element 120. The audio system may display one or more interactive elements next to an identified sound source, such that the user can easily interact with the interactive elements to change the sound signal generated by the sound source. For example, an airplane sound may be associated with an airplane icon, a bird sound may be associated with a bird icon, and so on and so forth. Further, the airplane sound may be associated with a mute button, a volume slider, a type change selector (e.g., to select an alternate sound), etc.

In some embodiments, a distance between the source of the sound signal and the user is also visualized on the GUI. For example, a sound signal that is further from the user is shown on the GUI 300A as further away from the user icon 302 or smaller than visualizations of closer sound sources, and vice versa. In another embodiment, sound visualizations can be color coded for sound distance, include a textual distance measurement, be automatically volume coded to distance, etc.

At block 440, process 400 can instructs a display to display a GUI that visually presents a sound space based on the visualizations and the directions of the sound signals. The audio system 200 uses the one or more sound signals in the local area and their positions (e.g., determined via DOA) to populate a sound space with visualizations of the sound signals. The visualizations of the sound signals can be placed at positions on the GUI corresponding to the directions (and in some cases distances) of the plurality of respective sound signals relative to a user. In some implementations, only visualizations for sounds determined to be within a threshold distance of the user are provided. The GUI can also output interactive elements (e.g., tools, command buttons, etc.) configured to receive a user interaction for modifying a parameter of a particular sound signal among the sound signals, such as a volume adjust or mute tool, a selection tool or functionality (e.g., which can then help the system map voice commands to that sound), a sound movement tool, a sound replacement/type adjustment tool, a tone adjustment tool, a speed adjustment tool, etc.

At block 450, process 400 can receives the user interaction. In some implementations, the user interaction can be a gesture, such as a tap (e.g., to toggle on/off muting the sound source), a pinch or stretch gesture (e.g., to adjust volume of the sound source), a swipe (e.g., to cycle the sound source to a next type), etc. In some embodiments, the user is able to modify the distance of the source of the sound signal, e.g., the GUI may allow the user to drag and drop a visualization to be closer to the user icon 302 to modify the distance of the corresponding sound signal. In some implementations, the user interaction can be an activation of a control, e.g., a GUI element attached to the sound source, such as a mute button, a volume slider, a type selector button, or a further controls button (which can open a sub-menu with additional audio controls such as tone selection, voice modulation/gender selection, playback speed selection, etc. In yet further embodiments, the user interaction can be a voice command, which may be interpreted by a machine learning model to map the voice command to a particular action such as muting, adjusting sound position in 3D space, or changing volume. In some cases, the machine learning model may automatically identify a target for the command based on context such as user eye gaze, a spoken object name (e.g., "mute the bird"), or what the user was previous referring to. In other cases, process 400 may determine a target for the command based on a user's previous explicit selection (e.g., tapping on a radio object before saying "mute").

In some embodiments, the audio system 200 is also configured to track eye movement of the user. Responsive to determining that the user's eyes are focused on a source of a particular sound signal, the audio system 200 may automatically enhance the particular sound signal. For example, when the user's eyes are focused on a bird, the audio system 200 may automatically enhance the bird sound of the corresponding bird and/or filter out other sounds. In some embodiments, a visualization corresponding to a sound signal is generated based on the sound signal captured by an imaging device. In some implementations, the system can map user gaze or a gesture to a selection for a particular sound, which can then have further commands (e.g., user voice provided commands) applied to it.

At block 460, process 400 can modify the parameter of the particular sound signal based in part on the user interaction. For example, and as discussed above, the indicated parameter modification can control one or more of: muting the sound, adjusting the sound volume, adjusting the sound position in 3D space, adjusting the sound tone, adjusting the sound playback speed, changing the sound to another type of sound, etc. In some implementations, where there are multiple co-present users, the parameter can control which of the co-present users are able to hear the sound.

At block 470, process 400 can present the sound signals with the particular sound signal modified based in part on the user interaction. For example, the modification of the parameter can include modifying a volume of the particular sound signal, e.g., muting, attenuating, or enhancing the particular sound signal. Responsive to the modification of the parameter, process 400 can mute, attenuate, or enhance the particular sound signal. As further examples, the modification of the parameter includes modifying a direction of the particular sound signal. Where the sound source is a real-world sound (e.g., not provided by the headset, the modification can further include generating an inverse wave for the original sound such that the user hears the sound as moved by the system but is no longer able to hear the original sound due to the inverse wave. Responsive to the modification of the parameter, the transfer function module 250, the beamforming module 270, and the sound filter module 280 is configured to generate one or more acoustic transfer functions to transform the particular sound signal to generate a modified sound signal. The modified sound signal sounds as if it were from a modified direction.

Figure 5:
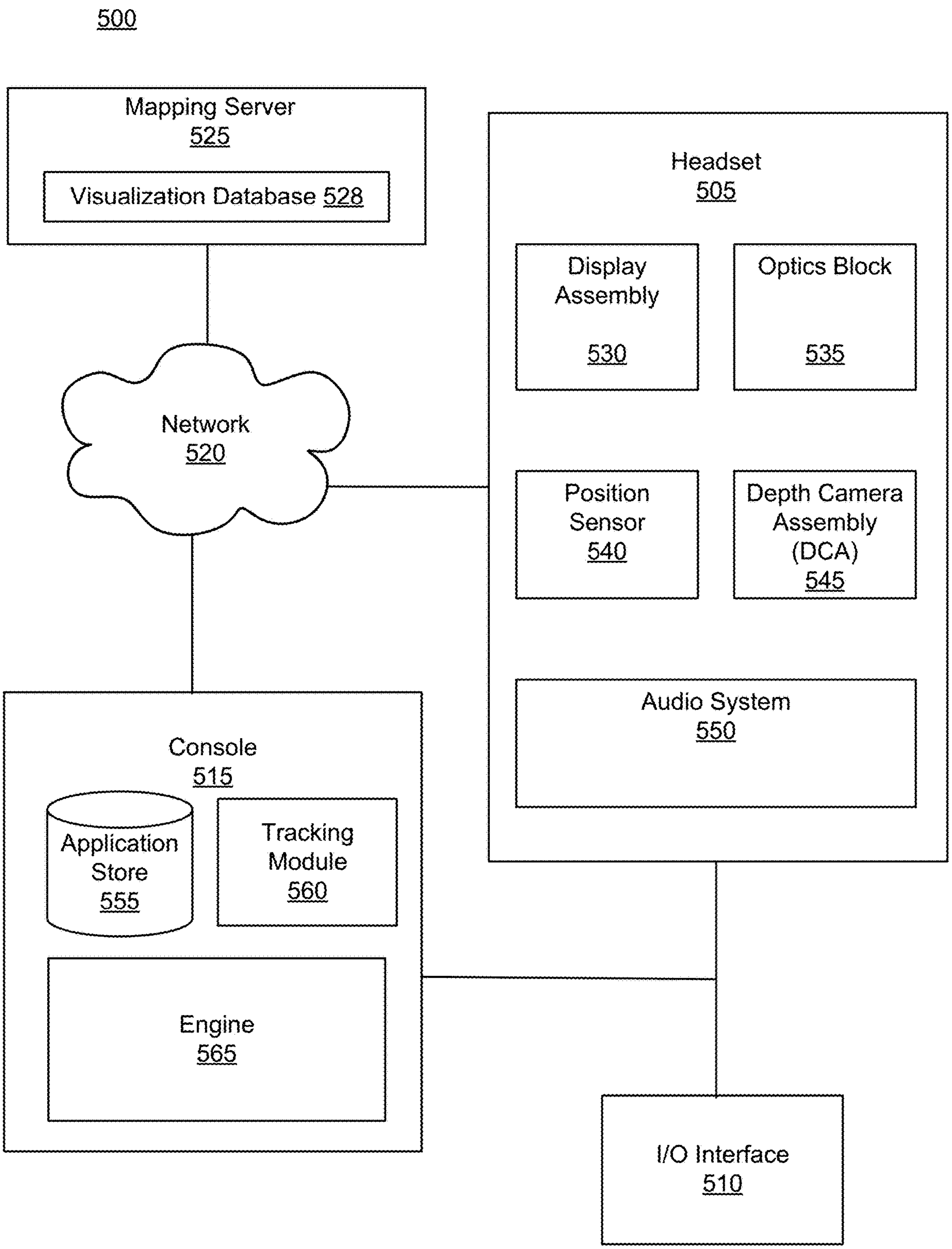
FIG. 5 illustrates a system that includes a headset, in accordance with one or more embodiments.

FIG. 5 is a system 500 that includes a headset 505, in accordance with one or more embodiments. In some embodiments, the headset 505 may be the headset 100 of FIG. 1A or the headset 105 of FIG. 1B. The system 500 may operate in an artificial reality environment (e.g., a virtual reality environment, an augmented reality environment, a mixed reality environment, or some combination thereof). The system 500 shown by FIG. 5 includes the headset 505, an input/output (I/O) interface 510 that is coupled to a console 515, the network 520, and the mapping server 525. While FIG. 5 shows an example system 500 including one headset 505 and one I/O interface 510, in other embodiments any number of these components may be included in the system 500. For example, there may be multiple headsets each having an associated I/O interface 510, with each headset and I/O interface 510 communicating with the console 515. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 515 may be provided by the headset 505.

The headset 505 includes the display assembly 530, an optics block 535, one or more position sensors 540, and the DCA 545. Some embodiments of headset 505 have different components than those described in conjunction with FIG. 5. Additionally, the functionality provided by various components described in conjunction with FIG. 5 may be differently distributed among the components of the headset 505 in other embodiments, or be captured in separate assemblies remote from the headset 505.

The display assembly 530 displays content to the user in accordance with data received from the console 515. The display assembly 530 displays the content using one or more display elements (e.g., the display elements 120). A display element may be, e.g., an electronic display. In various embodiments, the display assembly 530 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 535.

The optics block 535 may magnify image light received from the electronic display, corrects optical errors associated with the image light, and presents the corrected image light to one or both eyeboxes of the headset 505. In various embodiments, the optics block 535 includes one or more optical elements. Example optical elements included in the optics block 535 include: an aperture, a Fresnel lens, a convex lens, a concave lens, a filter, a reflecting surface, or any other suitable optical element that affects image light. Moreover, the optics block 535 may include combinations of different optical elements. In some embodiments, one or more of the optical elements in the optics block 535 may have one or more coatings, such as partially reflective or anti-reflective coatings.

Magnification and focusing of the image light by the optics block 535 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 535 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 535 corrects the distortion when it receives image light from the electronic display generated based on the content.

The position sensor 540 is an electronic device that generates data indicating a position of the headset 505. The position sensor 540 generates one or more measurement signals in response to motion of the headset 505. The position sensor 190 is an embodiment of the position sensor 540. Examples of a position sensor 540 include: one or more IMUs, one or more accelerometers, one or more gyroscopes, one or more magnetometers, another suitable type of sensor that detects motion, or some combination thereof. The position sensor 540 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 505 from the sampled data. For example, the IMU integrates the measurement signals received from the accelerometers over time to estimate a velocity vector and integrates the velocity vector over time to determine an estimated position of a reference point on the headset 505. The reference point is a point that may be used to describe the position of the headset 505. While the reference point may generally be defined as a point in space, however, in practice the reference point is defined as a point within the headset 505.

The DCA 545 generates depth information for a portion of the local area. The DCA includes one or more imaging devices and a DCA controller. The DCA 545 may also include an illuminator. Operation and structure of the DCA 545 is described above with regard to FIG. 1A.

The audio system 550 provides audio content to a user of the headset 505. The audio system 550 is substantially the same as the audio system 200 describe above. The audio system 550 may comprise one or acoustic sensors, one or more transducers, and an audio controller. The audio system 550 may provide spatialized audio content to the user. In some embodiments, the audio system 550 may request acoustic parameters from the mapping server 525 over the network 520. The acoustic parameters describe one or more acoustic properties (e.g., room impulse response, a reverberation time, a reverberation level, etc.) of the local area. The audio system 550 may provide information describing at least a portion of the local area from e.g., the DCA 545 and/or location information for the headset 505 from the position sensor 540. The audio system 550 may generate one or more sound filters using one or more of the acoustic parameters received from the mapping server 525, and use the sound filters to provide audio content to the user.

The I/O interface 510 is a device that allows a user to send action requests and receive responses from the console 515. An action request is a request to perform a particular action. For example, an action request may be an instruction to start or end capture of image or video data, or an instruction to perform a particular action within an application. The I/O interface 510 may include one or more input devices. Example input devices include: a keyboard, a mouse, a game controller, or any other suitable device for receiving action requests and communicating the action requests to the console 515. An action request received by the I/O interface 510 is communicated to the console 515, which performs an action corresponding to the action request. In some embodiments, the I/O interface 510 includes an IMU that captures calibration data indicating an estimated position of the I/O interface 510 relative to an initial position of the I/O interface 510. In some embodiments, the I/O interface 510 may provide haptic feedback to the user in accordance with instructions received from the console 515. For example, haptic feedback is provided when an action request is received, or the console 515 communicates instructions to the I/O interface 510 causing the I/O interface 510 to generate haptic feedback when the console 515 performs an action.

The console 515 provides content to the headset 505 for processing in accordance with information received from one or more of: the DCA 545, the headset 505, and the I/O interface 510. In the example shown in FIG. 5, the console 515 includes an application store 555, a tracking module 560, and an engine 565. Some embodiments of the console 515 have different modules or components than those described in conjunction with FIG. 5. Similarly, the functions further described below may be distributed among components of the console 515 in a different manner than described in conjunction with FIG. 5. In some embodiments, the functionality discussed herein with respect to the console 515 may be implemented in the headset 505, or a remote system.

The application store 555 stores one or more applications for execution by the console 515. An application is a group of instructions, that when executed by a processor, generates content for presentation to the user. Content generated by an application may be in response to inputs received from the user via movement of the headset 505 or the I/O interface 510. Examples of applications include: gaming applications, conferencing applications, video playback applications, or other suitable applications.

The tracking module 560 tracks movements of the headset 505 or of the I/O interface 510 using information from the DCA 545, the one or more position sensors 540, or some combination thereof. For example, the tracking module 560 determines a position of a reference point of the headset 505 in a mapping of a local area based on information from the headset 505. The tracking module 560 may also determine positions of an object or virtual object. Additionally, in some embodiments, the tracking module 560 may use portions of data indicating a position of the headset 505 from the position sensor 540 as well as representations of the local area from the DCA 545 to predict a future location of the headset 505. The tracking module 560 provides the estimated or predicted future position of the headset 505 or the I/O interface 510 to the engine 565.

The engine 565 executes applications and receives position information, acceleration information, velocity information, predicted future positions, or some combination thereof, of the headset 505 from the tracking module 560. Based on the received information, the engine 565 determines content to provide to the headset 505 for presentation to the user. For example, if the received information indicates that the user has looked to the left, the engine 565 generates content for the headset 505 that mirrors the user's movement in a virtual local area or in a local area augmenting the local area with additional content. Additionally, the engine 565 performs an action within an application executing on the console 515 in response to an action request received from the I/O interface 510 and provides feedback to the user that the action was performed. The provided feedback may be visual or audible feedback via the headset 505 or haptic feedback via the I/O interface 510.

The network 520 couples the headset 505 and/or the console 515 to the mapping server 525. The network 520 may include any combination of local area and/or wide area networks using both wireless and/or wired communication systems. For example, the network 520 may include the Internet, as well as mobile telephone networks. In one embodiment, the network 520 uses standard communications technologies and/or protocols. Hence, the network 520 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 520 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 525 may include a database that stores a virtual model describing a plurality of spaces, wherein one location in the virtual model corresponds to a current configuration of a local area of the headset 505. The mapping server 525 receives, from the headset 505 via the network 520, information describing at least a portion of the local area and/or location information for the local area. The user may adjust privacy settings to allow or prevent the headset 505 from transmitting information to the mapping server 525. The mapping server 525 determines, based on the received information and/or location information, a location in the virtual model that is associated with the local area of the headset 505. The mapping server 525 determines (e.g., retrieves) one or more acoustic parameters associated with the local area, based in part on the determined location in the virtual model and any acoustic parameters associated with the determined location. The mapping server 525 may transmit the location of the local area and any values of acoustic parameters associated with the local area to the headset 505.

In some embodiments, the mapping server 525 may also include a visualization database 528 configured to store visualizations and their corresponding types of sounds. When the audio system 550 detects one or more sound signals, the audio system 500 sends the sound signals to the mapping server 525, causing the mapping server 525 to determine a type of sound corresponding to each sound signal, and retrieve a visualization based on the determined types, and transmit the retrieved visualizations to the audio system 500. For example, the audio system 550 detects two sound signals and sends them to the mapping server 525. The mapping server 525 analyzes the two sound signals based on their parameters, such as frequencies, and determines that the two sound signals include a bird sound signal and an emergency vehicle sound signal. The mapping server 525 retrieves visualizations corresponding to bird sound signals and emergency vehicle sound signals, and sends the visualizations to the audio system 550. Responsive to receiving the visualizations from the mapping server 525, the audio system 550 instructs the display assembly 530 to present a GUI visualizing the sound space based on the received visualizations.

One or more components of system 500 may contain a privacy module that stores one or more privacy settings for user data elements. The user data elements describe the user or the headset 505. For example, the user data elements may describe a physical characteristic of the user, an action performed by the user, a location of the user of the headset 505, a location of the headset 505, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 500 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

We claim:

1. A method comprising:

displaying, via a graphical user interface (GUI) of an artificial reality system, a sound space that includes a plurality of visualizations corresponding to a respective plurality of sound signals from a respective plurality of sound sources, the respective plurality of sound signals being associated with a respective plurality of directions relative to the artificial reality system;

receiving, by the artificial reality system, a user input that moves one of the plurality of visualizations from a first location on the GUI to a second location on the GUI, the one of the plurality of visualizations corresponding to a first sound signal of a first sound source of the plurality of sound sources;

generating, responsive to the receiving the user input, a modified version of the first sound signal, the modified version appearing to emerge from the location on the GUI;

detecting, by the artificial reality system, a change in a position of the first sound source relative to the artificial reality system and a second sound signal from the first sound source from the position;

generating, by the artificial reality system, responsive to the detecting, an additional modified version of the second signal, the additional modified version appearing to emerge from the location on the GUI; and presenting, by the artificial reality system, the additional modified version.

2. The method of claim 1, further comprising:

placing, by the artificial reality system, each of the plurality of visualizations at a respective specific location on the GUI; and receiving, by the artificial reality system, at least an additional user input for modifying a parameter of at least one of the plurality of sound signals, wherein the parameter controls a volume of the at least one of the plurality of sound signals.

3. The method of claim 2, wherein the parameter further controls a direction of the at least one of the plurality of sound signals.

4. The method of claim 2, further comprising:

estimating a distance between at least one sound source of the plurality of sound sources and a respective at least one sound signal associated with the at least one sound source and the artificial reality system; and wherein at least one respective visualization of the plurality of visualizations corresponding to the at least one sound signal including an indicator of the distance.

5. The method of claim 4, wherein a parameter of the at least one sound signal controls a distance between the at least one sound signal and the artificial reality system.

6. The method of claim 1, wherein the plurality of sound signals are one or more of: a voice signal, an ambient noise signal, an emergency sound signal, or any combination thereof.

7. The method of claim 1, further comprising:

receiving an indication of a theme; and automatically adjusting parameters, corresponding to two or more of the plurality of sound signals, based on parameter settings specified for the indicated theme.

8. The method of claim 1, further comprising:

responsive to determining that a gaze location of a user corresponds to a sound source of a plurality of sound source that is associated with a respective sound signal of the plurality of sound signals, automatically adjusting a parameter associated with the respective sound signal, the adjusting controlling an enhancement factor for the respective sound signal.

9. A computer-readable storage medium storing instructions that, when executed by a computing system, cause the computing system to perform a process on an artificial reality system, the process comprising:

displaying, via a graphical user interface (GUI) of the artificial reality system, a sound space that includes a plurality of visualizations corresponding to a respective plurality of sound signals from a respective plurality of sound sources, the respective plurality of sound signals being associated with a respective plurality of directions relative to the artificial reality system;

receiving, by the artificial reality system, a user input that moves one of the plurality of visualizations from a first location on the GUI to a second location on the GUI, the one of the plurality of visualizations corresponding to a first sound signal of a first sound source of the plurality of sound sources;

generating, responsive to the receiving the user input, a modified version of the first sound signal, the modified version appearing to emerge from the location on the GUI;

detecting, by the artificial reality system, a change in a position of the first sound source relative to the artificial reality system and a second sound signal from the first sound source from the position;

generating, by the artificial reality system, responsive to the detecting, an additional modified version of the second signal, the additional modified version appearing to emerge from the location on the GUI; and presenting, by the artificial reality system, the additional modified version.

10. The computer-readable storage medium of claim 9, wherein the process further comprises:

placing, by the artificial reality system, each of the plurality of visualizations at a respective specific location on the GUI; and receiving, by the artificial reality system, at least an additional user input for modifying a parameter of at least one of the plurality of sound signals, wherein the parameter controls a volume of the at least one of the plurality of sound signals.

11. The computer-readable storage medium of claim 10, wherein the parameter of controls a direction of the at least one of the plurality of sound signals.

12. The computer-readable storage medium of claim 9, wherein the process further comprises:

estimating a distance between at least one sound source of a sound signal of the plurality of sound signals and the artificial reality system;

wherein at least one respective visualization of the plurality of visualizations corresponding to the at least one sound signal including an indicator of the distance.

13. The computer-readable storage medium of claim 12, wherein a parameter of the at least one sound signal controls a distance between the respective at least one sound signal and the artificial reality system.

14. A computing system for providing sound visualizations on an artificial reality system, the computing system comprising:

one or more processors; and one or more memories storing instructions that, when executed by the one or more processors, cause the computing system to perform a process comprising:

displaying, via a graphical user interface (GUI) of the artificial reality system, a sound space that includes a plurality of visualizations corresponding to a respective plurality of sound signals from a respective plurality of sound sources, the respective plurality of sound signals being associated with a respective plurality of directions relative to the artificial reality system;

receiving, by the artificial reality system, a user input that moves one of the plurality of visualizations from a first location on the GUI to a second location on the GUI, the one of the plurality of visualizations corresponding to a first sound signal of a first sound source of the plurality of sound sources;

generating, responsive to the receiving the user input, a modified version of the first sound signal, the modified version appearing to emerge from the location on the GUI;

detecting, by the artificial reality system, a change in a position of the first sound source relative to the artificial reality system and a second sound signal from the first sound source from the position;

generating, by the artificial reality system, responsive to the detecting, an additional modified version of the second signal, the additional modified version appearing to emerge from the location on the GUI; and presenting, by the artificial reality system, the additional modified version.

15. The computing system of claim 14, wherein the plurality of sound signals are one or more of: a voice signal, an ambient noise signal, an emergency sound signal, or any combination thereof.

16. The computing system of claim 14, wherein the process further comprises:

receiving an indication of a theme; and automatically adjusting parameters, corresponding to two or more of the plurality of sound signals, based on parameter settings specified for the indicated theme.

17. The computing system of claim 14, wherein the process further comprises:

responsive to determining that a gaze location of a user corresponds to a sound source of a plurality of sound source that is associated with a respective sound signal of the plurality of sound signals, adjusting an enhancement factor for the respective sound signal.

18. The computing system of claim 14, wherein the process further comprises:

placing, by the artificial reality system, each of the plurality of visualizations at a respective specific location on the GUI; and receiving, by the artificial reality system, at least an additional user input for modifying a parameter of at least one of the plurality of sound signals, wherein the parameter controls a volume of the at least one of the plurality of sound signals or a direction of the at least one of the plurality of sound signals.

* * * * *